United States Patent
Fellner et al.

(10) Patent No.: US 11,981,058 B2
(45) Date of Patent: May 14, 2024

(54) ONE-PIECE CAST COMPONENT HAVING AT LEAST ONE INTEGRATED ATTACHMENT PART, AND METHOD FOR PRODUCING A CAST COMPONENT

(71) Applicant: Lisa Draxlmaier GmbH, Vilsbiburg (DE)

(72) Inventors: Walter Fellner, Pischelsdorf (AT); Josef Christoph Bullock, Falkenberg (DE); Maria Dilena, Mattsee (AT)

(73) Assignee: LISA DRAXLMAIER GMBH, Vilsbiburg (DE)

( * ) Notice: Subject to any disclaimer, the term of this patent is extended or adjusted under 35 U.S.C. 154(b) by 83 days.

(21) Appl. No.: 17/778,833

(22) PCT Filed: Nov. 17, 2020

(86) PCT No.: PCT/EP2020/082344
§ 371 (c)(1),
(2) Date: May 21, 2022

(87) PCT Pub. No.: WO2021/099294
PCT Pub. Date: May 27, 2021

(65) Prior Publication Data
US 2022/0410449 A1    Dec. 29, 2022

(30) Foreign Application Priority Data

Nov. 21, 2019 (DE) .......................... 102019131396.1

(51) Int. Cl.
*E05D 1/00* (2006.01)
*B29C 39/42* (2006.01)
(Continued)

(52) U.S. Cl.
CPC .......... *B29C 45/0081* (2013.01); *B29C 39/42* (2013.01); *B29C 45/0017* (2013.01);
(Continued)

(58) Field of Classification Search
CPC . B29C 45/0017; B29C 45/0081; B29C 45/16; B29C 39/42; B29K 2995/0016;
(Continued)

(56) References Cited

U.S. PATENT DOCUMENTS 6,053,458 A      4/2000  Meyer
6,154,927 A  *  12/2000  Oi .......................... F16L 3/1033
                                                             16/386
(Continued)

FOREIGN PATENT DOCUMENTS

DE        0308679 A1      3/1989
EP        2641522 A1 *    9/2013  ............. A47K 10/38
WO   WO-0189795 A1 *   11/2001  ......... B29C 45/0017

OTHER PUBLICATIONS

DE0308679 machine language English translation of the Abstract.
International Search report for PCT/EP2020/082344.

*Primary Examiner* — Chuck Y Mah
(74) *Attorney, Agent, or Firm* — BelayIP

(57) ABSTRACT

A one-piece cast component having at least one integrated attachment part is disclosed. The component includes at least one pin which is rigidly connected to an attachment part; a housing at least partially enclosing the pin in a contactless manner; the pin being arranged in the axial direction between two axial connecting webs and being rigidly connected via the latter to the housing; the pin being arranged in the radial direction between a plurality of radial connecting webs and being rigidly connected via the latter to the housing; wherein the connecting webs are dimensioned in such a way that only the latter break at respective predetermined breaking points when pivoting the attachment part for the first time relative to the housing, whereafter the attachment part, together with the pin, is mounted so as to be pivotable with respect to the housing. The regions of the connecting webs that remain on the housing after the (Continued)

breaking operation prevent the pin from being removed from the housing. The disclosure further relates to a method for producing such a cast component having an integrated attachment part.

10 Claims, 3 Drawing Sheets

(51) Int. Cl.
    *B29C 45/00*     (2006.01)
    *B29C 45/16*     (2006.01)
    *E05D 1/04*     (2006.01)
    *B29L 31/22*     (2006.01)

(52) U.S. Cl.
    CPC ............... *B29C 45/16* (2013.01); *E05D 1/04* (2013.01); *B29C 2045/0089* (2013.01); *B29K 2995/0016* (2013.01); *B29L 2031/22* (2013.01)

(58) Field of Classification Search
    CPC ............ B29L 2031/22; B29L 2031/56; B29L 2031/565; B60S 1/50; B65D 2543/00; B65D 2543/00009; B65D 2543/00018; B65D 2543/00296; B65D 43/162; B65D 43/164; B65D 43/169; B65D 43/166; E60D 47/0885; E60D 47/0804; E60D 47/08; E05D 1/02; E05D 1/04; E05D 7/00; E05D 15/24; E05D 15/242; E05D 3/022; E05Y 2900/602
    See application file for complete search history.

(56) References Cited

U.S. PATENT DOCUMENTS

| | | | |
|---|---|---|---|
| 6,701,573 B1* | 3/2004 | Ciavarella | E05D 7/1055<br>16/268 |
| 8,261,410 B2* | 9/2012 | Sze | B29C 49/48<br>16/385 |
| 8,756,765 B2* | 6/2014 | Broadhead | B29C 45/0017<br>16/225 |
| 8,882,072 B2* | 11/2014 | Hattori | B29C 45/006<br>248/65 |
| 9,260,898 B2* | 2/2016 | Soma | E05D 7/105 |
| 2004/0244145 A1* | 12/2004 | Anscher | B29C 45/0053<br>16/222 |
| 2004/0244149 A1 | 12/2004 | Anscher | |
| 2007/0102391 A1* | 5/2007 | Hoepner | B65D 55/024<br>215/237 |
| 2008/0134466 A1* | 6/2008 | Massengill | B29C 45/0017<br>16/386 |
| 2008/0263821 A1 | 10/2008 | Levey et al. | |
| 2012/0067914 A1* | 3/2012 | Sadler | H01M 50/24<br>220/810 |
| 2015/0059127 A1* | 3/2015 | Sommer | B60S 1/50<br>16/385 |
| 2021/0119424 A1* | 4/2021 | Coenegracht | E05D 3/022 |

* cited by examiner ly flexible
ONE-PIECE CAST COMPONENT HAVING AT LEAST ONE INTEGRATED ATTACHMENT PART, AND METHOD FOR PRODUCING A CAST COMPONENT

CROSS REFERENCE TO RELATED APPLICATIONS

This application is a United States national stage of International Application PCT/EP2020/082344, dated Nov. 17, 2020, and claims priority to Germany patent application 102019131396.1 dated Nov. 21, 2019, the both of which are herein and hereby incorporated by reference.

BACKGROUND OF THE INVENTION

Technical Area

The present invention relates to a one-piece cast component having at least one integrated add-on part, and to a method of manufacturing such a cast component.

State of the Art

In a wide variety of components, such as lids and the like, it is often necessary to provide a pivotable add-on part, e.g., in the form of a cap. For example, it may be necessary to swivel such a cap in such a way that an area lying below the cap is opened and/or otherwise released, for example to allow a screw connection or the like. In the case of plastic components in particular, it is common to provide a film hinge in order to implement such a pivoting cap. Realizing a permanently functional film hinge is often not easy. In particular, the choice of material, design and manufacturing parameters often have to be adjusted at great expense in order to find a stable series production process, by means of which a permanently functional film hinge can be achieved.

Depending on the boundary conditions, such film hinges may also not be able to provide a permanently durable solution for a pivoting cap or other pivoting add-on parts. In addition, such film hinges are often equipped with elastic materials and, in the case of injection molding processes, made by means of valve gate nozzles and cascade controls. If such add-on parts are to be connected to the rest of the component in an articulated manner, it is often also necessary to provide one or more slides in a mold. In general, moving elements, such as joints for such attachments, are used when necessary; such elements made of elastomers are often used as well, since elastomers being relatively flexible and elastic. However, such elastomers are also and often relatively expensive.

SUMMARY OF THE INVENTION

It is therefore an object and task of the present invention to provide a particularly simple and durable solution by means of which an integrated and pivotable add-on part can be realized on a cast component.

This task is solved by a one-piece cast component and by a method for producing such a cast component.

The one-piece cast component according to the present invention, with at least one integrated add-on part, comprises at least one axle rigidly connected to the add-on part and an enclosure at least partially surrounding the axle without contact. The axle is arranged in the axial direction between two axial connecting webs and is rigidly connected to the housing via the latter. Furthermore, the axle is arranged in the radial direction between a plurality of radial connecting webs and rigidly connected to the housing via them. The axial and radial connecting webs are dimensioned so that only these break at the respective predetermined breaking points when the add-on part is pivoted relative to the housing for the first time, after which the add-on part together with the axle is mounted so that it can be pivoted relative to the housing. After breaking at the enclosure, the remaining areas of the connecting webs prevent removal of the axle from the enclosure.

Initially, therefore, the cast component according to the invention consists of a single piece. Only after the integrated add-on part has been pivoted relative to the enclosure would, for the first time, the connecting webs break at their predetermined breaking points. After this, the originally one-piece cast component would now consist of two parts. The add-on part is still rigidly connected to the axle, but the axle is no longer rigidly connected to the housing and thus no longer to the rest of the cast component. In other words, the axle and the enclosure form a joint with a single degree of rotational freedom. Accordingly, the add-on part is, after the initial pivoting and breaking or cracking of the axle and the housing, together with the connecting webs. It can be easily pivoted relative to the housing and thus to the rest of the cast component. In other words, the axle and the housing together with the connecting webs form a crack joint or a breakable joint. Only by breaking open the cast component at defined points, namely at the intended breaking points of the connecting webs, can the add-on part be pivoted or moved. In particular, the connecting webs are dimensioned or designed in such a way that the areas of the connecting webs remaining on the housing after breaking prevent the axle from being removed from the housing. This means that the swiveling add-on part can be made to become and otherwise function reliably over the long term.

The connecting webs allow a casting material, from which the casting component is manufactured in one piece or as a single piece, to flow during a casting process, in particular, also from the enclosure to the at least one axis. In other words, the connecting webs thus serve as overruns during the casting process. The shape and dimensions of the connecting webs define the respective predetermined breaking points and the correspondingly required breaking forces. After the breaking of the connecting webs, the housing also ensures that the axis is reliably supported in the axial direction and in the radial direction.

The cast component may be, for example, a cover or the like for a printed circuit board, whereby the add-on component may serve, for example, to cover a positive pole or a negative pole of the printed circuit board as well as to release it if required. In principle, the one-piece cast component according to the invention can be any component which has at least one integrated add-on part. Since the cast component is made in one piece, there is no need for complex assembly of the swivel-mounted component. In addition, the one-piece cast component can be produced particularly easily by means of a casting process due to its one-piece or one-piece design. The cast component can be produced by means of a simply constructed tool, thereby resulting in relatively low tooling costs. In particular, the axle and the housing can also be made, for example, of a reinforced material, so that a permanently reliable pivotability of the attachment can be ensured.

One possible embodiment of the present invention provides at least for the axle, the housing and the connecting webs to have no undercuts with respect to a predetermined demolding direction to the mold. The crack joint or the break-open joint, which comprises the axle, the housing and the connecting webs have no undercuts in the said demolding direction and can thus be produced particularly easily. In particular, it is also possible for the entire cast component to have no undercuts in relation to the specified demolding direction from the mold. In this case, the entire cast component can be removed simply by opening the relevant mold without having to use slides or other means which are required and must be moved. This means that the cast component can be produced with a particularly high process, reliably and at low tooling costs. Beyond the crackjoint, i.e., at the add-on part and the rest of the cast component, there may be geometries which require slides and/or other means to realize undercuts in these areas. It is also possible that further assembly steps may result in other elements being attached to the casting.

In another possible embodiment of the present invention, the cast component includes a latching mechanism configured to hold the attachment component in at least one predetermined and pivoted position. The latching mechanism may also be adapted to and may be designed to hold the add-on part in different swivel positions. For example, it is conceivable that the latching mechanism is designed to hold the attachment part at a 90° angle or also, for example, at a 120° angle with respect to an initial position. If required, the add-on part can thus be moved into the at least one predefined swivel position in which it is held by the latching mechanism in place. In this way, for example, a screw connection to be made underneath the attachment part can be made particularly easily without, for example, a worker having to hold the attachment part in the specified swivel position.

According to another possible embodiment of the present invention, it is provided that the latching mechanism comprises a lug on the axle, which latches with a mating contour of the housing in the predefined swivel position of the add-on part. If for example several swivel positions are to be realized, in which the latching mechanism can hold the attachment part, several lugs on the axle and/or mating contours on the housing can also be provided. Due to the at least one nose and corresponding counter contour of the enclosure, it is possible in a particularly simple manner to further make it possible to hold the attachment in the at least one predefined pivoted position. When the latching mechanism is latched and also when it is released, only elastic deformations take place, so that the latching mechanism can be used again and again, in particular without it suffering any damage.

In another possible embodiment of the present invention, it is provided that the one-piece cast component is made of a plastic, a fiber-reinforced plastic, and/or a flame retardant material. For example, it is possible that the cast component is made of a polybutylene terephthalate. It is also possible, for example, that the cast component is made from a polybutylene terephthalate reinforced with glass fibers. Other plastics or plastics with a wide variety of additives can also be used to produce the one-piece casting.

In another possible embodiment of the invention, the cast component includes two of the axes, which are axially spaced and aligned with each other and are each rigidly connected to the add-on part in the case the enclosure has two mutually delimited enclosure regions, each of which surrounds or at least partially surrounds the axles without contact. In addition, the cast component has four of the axial connecting webs, with the axles each being connected in the axial direction between two of the axial connecting webs as well as being rigidly connected to the respective enclosure areas via the aforementioned. Furthermore, the axles are each arranged in the radial direction between several of the radial connecting webs and are accordingly rigidly connected to the respective housing areas. In this case, too, the connecting webs are dimensioned in such a way that when the axles are rotated for the first time, i.e., in the case of a swiveling of the add-on part, a break relative to the housing at respective predetermined breaking points and then the add-on part together with the axles are mounted so that they can swivel relative to the housing, whereby the areas of the connecting webs remaining on the housing areas after the breaking prevent the axles from being removed from the housing areas. Depending on the size of the add-on part, it may be advantageous to use the two axles or even several such axles. After breaking open the predetermined breaking points, the axles can thus be mounted on the remaining cast component in a particularly reliable manner so that they can pivot. It is also possible, for example, to provide several of the add-on parts on the one-piece cast component, whereby these in turn are each rigidly connected to a respective axle at least in the manner already described. The respective axes can in turn be contactless and at least partially surrounded by a respective enclosure.

According to another possible embodiment of the present invention, it is provided that the enclosure regions are separated from one another by a common central region of the enclosure and are bounded by respective outer regions of the enclosure, the radial connecting webs being arranged exclusively on the outer regions on a front side of the cast component and the radial connecting webs being arranged exclusively on the central region on a rear side of the cast component. In this way it is possible to ensure that the cast component does not have any undercuts in relation to a predetermined demolding direction from a mold. In addition, it is equally possible to ensure after breaking or cracking of the respective connecting webs at their predetermined breaking points that the axles cannot be removed from the enclosure. However, removal of the add-on part can, for example, be achieved by deformation of the add-on part which can be achieved if it is sufficiently flexible or deformable.

Even after the connecting webs have been broken at their predetermined breaking points, it can still therefore be ensured that the joint formed by the axles and the housing reliably permits a pivoting movement of the add-on part in the long term, without the add-on part being separated and removed from the rest of the cast component.

In the method for producing the cast component according to the invention, or in a possible embodiment of the cast component according to the invention, at least one casting material is poured into a casting chamber enclosed between two mold halves. The cavity is introduced and the cast component is produced with curing of the at least one casting material, whereby at least the axle, the housing and the connecting webs are produced without undercuts in relation to a predetermined demolding direction. The cavity and the cast component are thus designed in such a way that at least the crack joint can be produced, for example, without the use of slides. Additionally and for example, no inclined ejectors, spring-loaded ejectors or loose parts are required in the area of the crack joint. Forced demolding of the casting in the area of the crack joint, for example, can also be omitted. In particular, the mold halves and the entire cast component can be designed in such a way that the entire cast component can be easily ejected from the mold with reference to the specified demolding direction after the two mold halves have been opened. These can be removed, so the entire cast component has no undercuts with respect to the predetermined demolding direction. By means of the method according to the invention, it is possible to produce the one-piece cast component particularly simply and reliably, and the casting tool used for this can be of a particularly simple design. Beyond the crack joint, i.e., in the case of the add-on part and the rest of the cast component, it is also possible to produce geometries which require slides and/or undercuts in these areas. It is still further possible for other elements to be attached to the casting by further assembly steps.

One possible embodiment of the method according to the invention provides that the cast component is produced by means of an injection molding or vacuum molding process. By means of injection molding, it is possible to produce the cast component reliably and cost-effectively in large series, i.e., in particularly large quantities. By means of vacuum casting, it is possible in particular to produce small quantities of the cast component quickly and inexpensively.

Finally, a further possible embodiment of the method according to the invention provides that the cast component is produced from a first and second casting material, which have different properties. Thus, the two casting materials may be made of different materials. Different properties as used herein may refer to and otherwise be understood as referring to casting materials having different mechanical, thermal and/or color properties, in particular in the cured state. The first casting material is supplied at a first location of the cavity, which is arranged remotely from the add-on part to be produced, and the second casting material is supplied at a second location of the cavity which is arranged in the region of the add-on part to be produced. The introduction of the cast materials is controlled in such a way that the respective flow fronts of the cast materials meet in an area of the cast component far from the add-on part. The connecting webs serving as overruns allow the second casting material to flow from the add-on part to be produced into the remaining area of the cast component. Through the use of the two casting materials, which differ in terms of their properties, it is possible to produce the add-on part in a very simple manner, e.g., in a different color and/or with different mechanical and/or thermal properties from the rest of the cast component. For example, a cascade control can be used to control the clash of the said flow fronts of the different casting materials to a very specific desired area, for example, to the axis. Alternatively or additionally, it is possible to use locking slides to ensure that the two different casting materials meet at defined points. However, it is also possible to provide only a single gating point or even more than two gating points during the production of the cast component.

DETAILED DESCRIPTION OF THE SEVERAL VIEWS OF THE DRAWINGS

Further advantages, features and details of the invention and its various embodiments may be apparent from the following description of possible embodiments and from the drawing. The features and combinations of features mentioned above in the description, as well as those described below in the figure description and/or in the figures alone, are usable not only in the combinations indicated in each case, but also in other combinations or on their own, without departing from the scope of the invention.

The present invention is described in more detail below with reference to examples of embodiments and the figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

In the figures, identical or functionally identical elements may be marked with the same reference signs.

Figure 1:
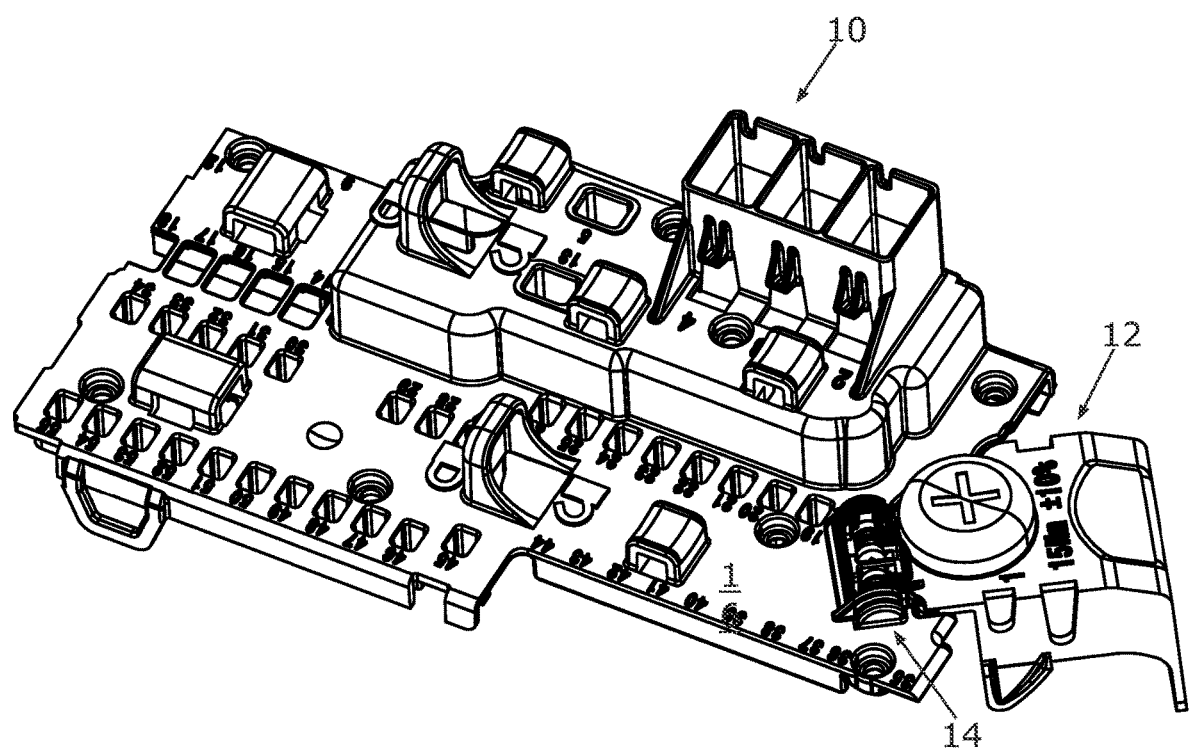
FIG. 1 depicts a perspective view of a cast component with an integrated cap.

A cast component 10 with an integrated cap 12 is shown in a perspective view in FIG. 1. The cap 12 shall now be discussed in more detail. The following explanations may also apply to any other integrated add-on parts, which may not necessarily be limited to the cap 12 nor cap-type attachments. The cast component 10 is initially manufactured as a single piece. In other words, the remaining cast component 10 and the cap 12 are not two parts but a single part. After first pivoting the integrated cap 12 with respect to the remaining cast component 10 along predetermined breaking points, which are not indicated in more detail here, the two are broken open or cracked, and as a result a joint 14 is formed. After the first initial pivoting of the cap 12 relative to the rest of the cast component 10 and the corresponding breaking open of the said predetermined breaking points, the cast component 10 with the integrated cap 12 are no longer formed as a single or one piece, but instead the cast component 10 is formed in two pieces. The cast component 10 may then be, for example, a cover, a lid, a protective cap or the like. In the assembled state of the cast component 10, the cap 12 may serve, for example, to release a positive terminal or the like when the cap 12 is pivoted upward.

Figure 2:
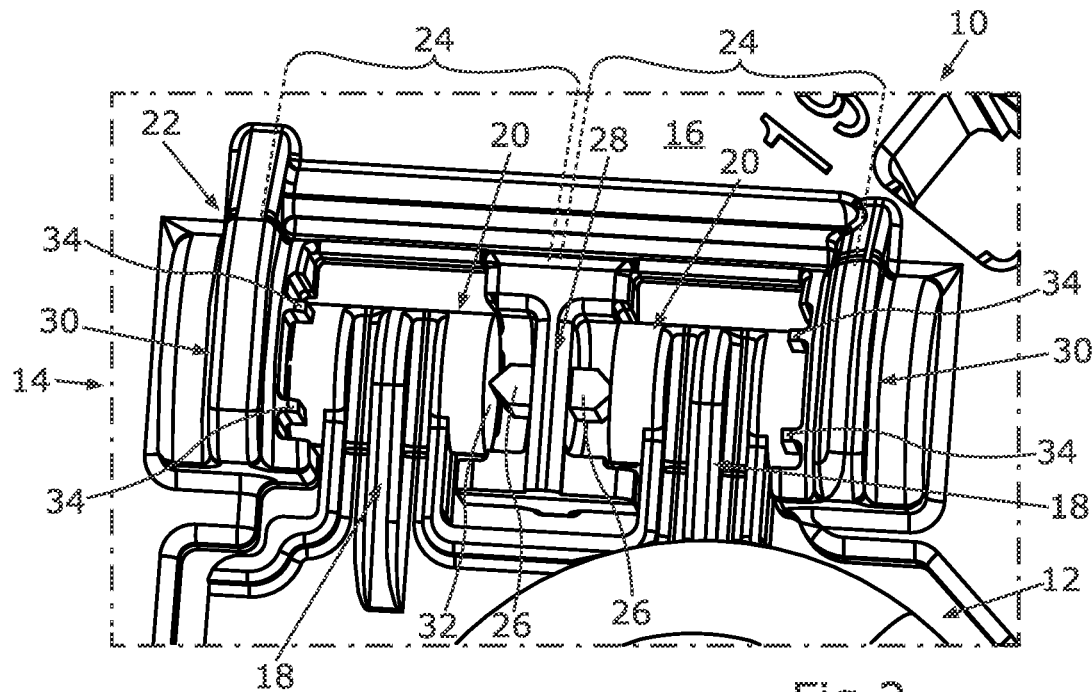
FIG. 2 depicts a detailed view of a front side of the casting in the area of two axles to which the cap is rigidly connected.

In FIG. 2, a front side 16 of the cast component 10 in the region of the formable joint 14 is shown in a plan view. The cap 12 is rigidly connected to respective axles 20 via respective extensions 18. An enclosure 22 partially surrounds the axles 20 in a non-contacting manner. Thus, the cast component 10 has the two axles 20 axially spaced and aligned with each other, the two axles 20 each being rigidly connected to the cap 12 through the intermediary of the two extensions 18. The enclosure 22 has two mutually distinct enclosure regions 24, which surround the respective axles 20 in a non-contacting and at least partial contacting manner.

The cast component 10 has four axial connecting webs 26, although in the present case only two of the connecting webs 26 can be seen from the Figures. The enclosure regions 24 are separated from each other by a common center region 28 and are bounded by respective outer regions 30 of the enclosure 22. As can be seen herein, two of the axial connecting webs 26 extend in opposite axial directions from the center region 28 toward the respective enclosure regions 24 and are rigidly connected to respective end faces 32 of the axles 20. The axles 20 are also each arranged in the radial direction between a number of radial connecting webs 34 and are rigidly connected via these to the respective enclosure areas 24.

Figure 3:
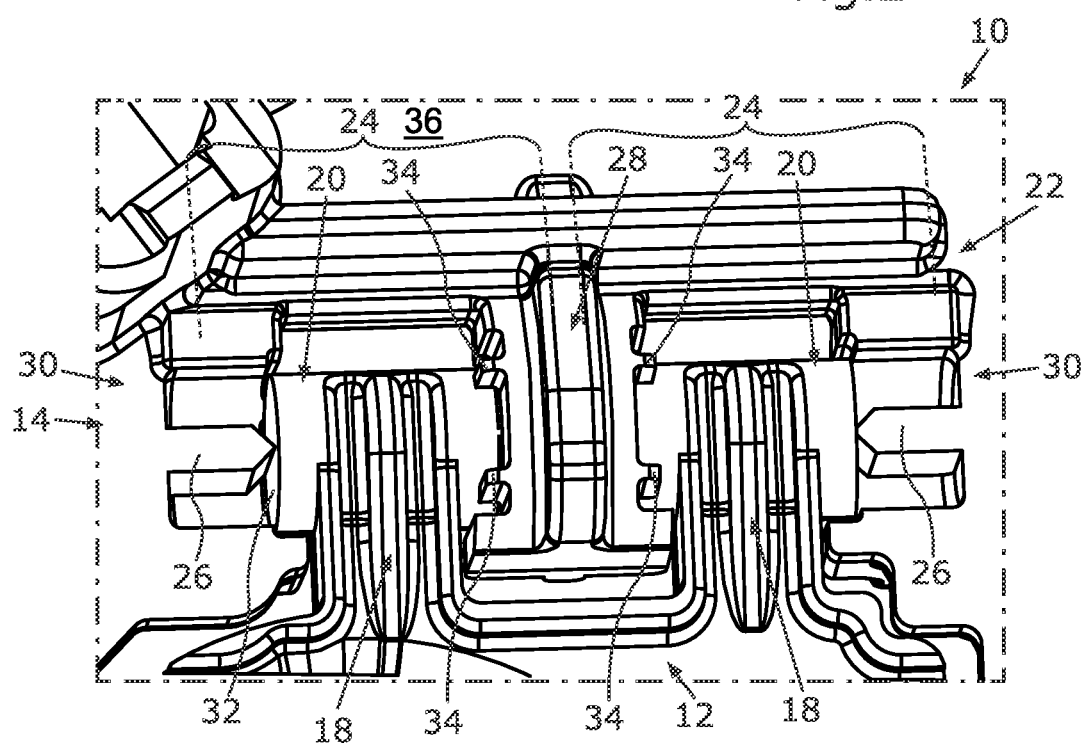
FIG. 3 depicts a detailed view of a rear side of the casting, again in an area where the cap is rigidly connected to the two axles.

In FIG. 3, a rear side 36 of the cast component 10 is shown, again in the region of the joint 14. As depicted in the figure, the further axial connecting webs 26 may still be seen extending from the respective outer regions 30 of the enclosure 22 in the axial direction and in the direction of the respective axles 20, and in turn rigidly connected to associated end faces 32 of the axles 20. The axles 20 are thus each connected in the axial direction between two of the axial connecting webs 26 and are thereby rigidly connected to the respective enclosure regions 24. Further radial connecting webs 34 are also depicted having axles 20 which are rigidly connected to the respective enclosure regions 24.

In comparing FIGS. 2 and 3, it can be seen that at the front side 16 of the cast component 10 (see FIG. 2), the radial connecting webs 34 are arranged exclusively at the outer regions 30 of the enclosure 22. While on the rear side 36 of the cast component 10 (see FIG. 3), the radial connecting webs 34 are arranged exclusively at the central region 28. The entire cast component 10 can thus be quite formed simply from a mold, since, in particular, the radial connecting webs 34 do not form any undercuts in the said demolding direction.

With reference back to the discussion of FIG. 1, the cast component 10 is initially formed in one piece or as a single piece after its manufacture. In other words, the cap 12 is thus initially rigidly and integrally connected to the rest of the cast component 10. In order to implement the aforementioned joint 14, the cap 12 simply has to be pivoted relative to the enclosure 22 after the cast component 10 has been produced. The axial connecting webs 26 and the radial connecting webs 34 are dimensioned in such a way that only these are required when the cap 12 is pivoted for the first time relative to the enclosure 22 break at respective predetermined breaking points.

Thereafter, the cap 12, together with the axles 20, is pivotally mounted relative to the enclosure 22 and thus pivotally mounted relative to the remainder of the cast component 10. By virtue of joint 14, the axles 20, together with the enclosure 22, to which the axles 20 are connected after the breaking open or cracking of the connecting webs 26, 34, are, in fact, no longer connected. After the breaking of the connecting webs 26, 34 at said predetermined breaking points, the enclosure 22 and the areas of the connecting webs 26, 34 remaining on the enclosure 22 after the breaking ensure that the axles 20 may not be removed from the enclosure 22 or the enclosure areas 24, respectively. The cap 12 is therefore permanently and reliably connected to the remaining cast component 10, whereby it can be swiveled again and again relative to the rest of the cast component 10 as may be required due to the formation of the joint 14.

The cast component 10 may further include a latching mechanism, which is not depicted herein, and which is designed to hold the cap 12 in at least one predetermined pivoted position. For example, the latching mechanism may have a lug, also not shown in more detail here, on the respective axles 20 that can latch with a corresponding mating contour of the enclosure 22 in the predetermined pivoted position of the cap 12. The latching mechanism may also be configured to the cap 12 and can be held in different pivoted positions. For example, starting from the initial position shown in FIG. 1, it is possible to open the cap 12 by 90° or, for example, also by 120°, whereby the cap 12 can be held in these positions by said latching mechanism.

The cast component 10 may in particular be made of a plastic, a fiber-reinforced plastic, and/or a flame retardant material. For example, the cast component 10 may be made of polybutylene terephthalate and/or, for example, a polybutylene terephthalate reinforced with glass fibers. Other plastics with appropriately provided additives can also be used to produce the cast component 10.

Figure 4:
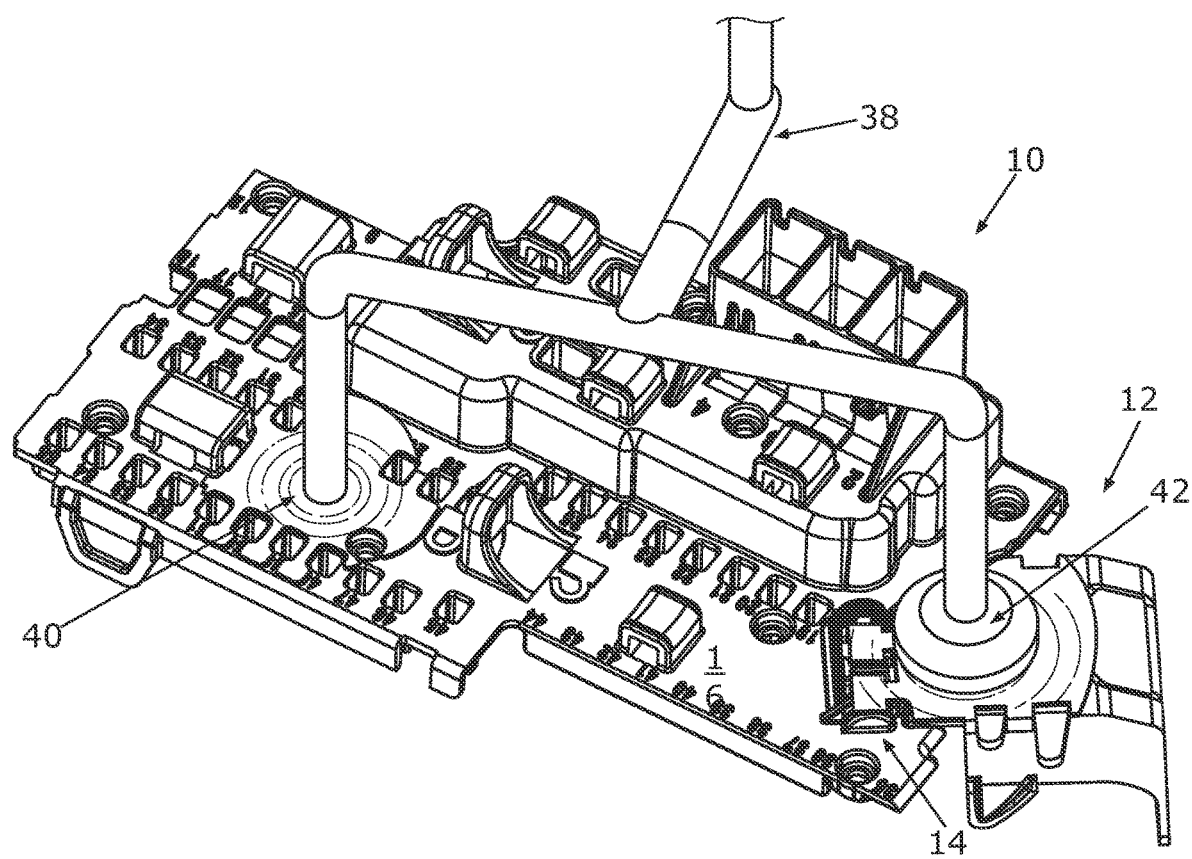
FIG. 4 depicts a schematic representation of a casting process for producing the cast component.

FIG. 4 schematically illustrates a casting process for producing the cast component 10. As shown, a gating system 38 is depicted by means of which two casting materials having different colors can be fed to a cavity which is not shown nor marked in more detail. Alternatively or additionally, the casting materials may differ from one another with regard to further properties, e.g., having different mechanical and/or thermal properties.

For ease of understanding, only the fact that the casting materials differ in terms of color is discussed below by way of example. In this way, it is possible to form the cap 12 in a different color than the rest of the cast component 10. By means of the gating system 38, a first casting material can be supplied to a first location 40 of said cavity, which is located remote from the cap 12 to be produced. By means of the gating system 38, a second molding material having a different color than the first molding material may be introduced at a second location 42 of the cavity which is located proximate to the cap 12 to be manufactured. In particular, the introduction of the casting materials having the different colors may be controlled such that respective flow fronts of the different casting materials, which are not shown in greater detail herein, meet in an area of the casting component 10 remote from the cap 12. For example, cascade control may be used to ensure this. For example, it is possible to control the introduction of the casting materials having the different colors so that said flow fronts of the two casting materials meet precisely at the feasible joint 14. In this way, it is possible to neatly distinguish the cap 12 from the rest of the cast component 10 in terms of color.

In particular, a sliderless mold can be used in the production of the cast component 10. This is because, as already mentioned, the cast component 10 can be designed in such a way that it does not have any undercuts with respect to a predetermined demolding direction from a mold. For example, it is also possible to provide, in the case of an upper mold half and/or a lower mold half, respective mold inserts which define the contour of the cast component 10. By using said tool inserts, which are designed to be exchangeable, it is possible in a simple manner to realize the most varied contours or shapes in the cast component 10. Alternatively or additionally, it is thus also possible to simply replace said tool inserts when they become worn. This can be particularly useful if an injection mold is used to produce the cast component 10. Alternatively, it is also possible to manufacture the cast component 10 by means of a vacuum casting process, for example. This may be particularly suitable if the cast component 10 is manufactured in relatively small quantities, whereas an injection molding process is particularly suitable for high quantities.

Some preferred embodiments of apparatus according to the invention have been disclosed above. The invention is not limited to the solutions explained above, but the innovative solutions can be applied in different ways within the limits set by the claims.

The invention claimed is:

1. A one-piece cast component with at least one integrated add-on part, the component comprising:
   at least one axle rigidly connected to the add-on part;
   an enclosure contactlessly and at least partially surrounding the axle;
   wherein the axle is arranged in the axial direction between two axial connecting webs and is rigidly connected to the enclosure via the connecting webs;
   wherein the axle is arranged in a radial direction between several radial connecting webs and is rigidly connected to the enclosure via the connecting webs;
   wherein the connecting webs are dimensioned in such a way that only these break at respective predetermined breaking points when the add-on part is pivoted relative to the enclosure for the first time and thereafter the add-on part together with the axle is mounted pivotably relative to the enclosure, and
   wherein areas of the connecting webs remaining on the enclosure after breaking prevent removal of the axle from the enclosure.

2. The one-piece cast component according to claim 1, wherein the axle, the enclosure and the connecting webs do not have any undercuts with respect to a predetermined demolding direction from a mold.

3. The one-piece cast component according to claim 1, wherein the cast component comprises a latching mechanism configured to hold the add-on part in at least one predetermined pivoted position.

4. The one-piece cast component according to claim 3, wherein the latching mechanism comprises a lug on the axle configured to latch with a counter contour of the enclosure in the predetermined pivoted position of the add-on part.

5. The one-piece cast component according claim 1, wherein the one-piece cast component is made of at least one of a plastic, a fiber-reinforced plastic and a flame-retardant material.

6. The one-piece cast component according to claim 1, wherein:
   the cast component comprises two of the axles which are axially spaced apart and aligned with one another and are each rigidly connected to the add-on part;
   the enclosure comprises two mutually delimited enclosure regions arranged to surround the axles without contact or with at least partial contact;
   the cast component comprises four of the axial connecting webs, the axles each being arranged in the axial direction between two of the axial connecting webs and being rigidly connected via the latter to the respective enclosure regions; and
   the axles each are arranged in the radial direction between a plurality of the radial connecting webs and are rigidly connected via the latter to the respective enclosure regions.

7. The one-piece cast component according to claim 6, wherein:
   the enclosure regions are arranged separated from one another by a common central region of the enclosure and are bounded by respective outer regions of the enclosure;
   on a front side of the cast component, the radial connecting webs are arranged exclusively at the outer regions; and
   on a rear side of the cast component, the radial connecting webs are arranged exclusively at the central region.

8. A method for producing a cast component with an integrated add-on part, the method comprising the steps of:
   connecting at least one axle to the add-on part;
   at least partially surrounding the axle with an enclosure such that the enclosure does not contact the axle;
   introducing at least one casting material into a cavity enclosed between two mold halves;
   producing a cast component with curing of the at least one casting material,
   wherein the axle is arranged in the axial direction between two axial connecting webs and is rigidly connected to the enclosure via the connecting webs;
   wherein the axle is arranged in a radial direction between several radial connecting webs and is rigidly connected to the enclosure via the connecting webs;
   wherein the connecting webs are dimensioned in such a way that only these break at respective predetermined breaking points when the add-on part is pivoted relative to the enclosure for the first time and thereafter the add-on part together with the axle is mounted pivotably relative to the enclosure,
   wherein at least the axle, the enclosure and the connecting webs are produced without undercuts with respect to a predetermined demolding direction; and
   wherein areas of the connecting webs remaining on the enclosure after breaking prevent removal of the axle from the enclosure.

9. The method according to claim 8, further comprising the steps of producing the cast component by means of an injection molding or vacuum casting process.

10. The method according to claim 8, further comprising the steps of:
   producing the cast component from a first and second casting material which have different properties;
   supplying the first casting material at a first location of the cavity which is remote from the add-on part to be produced;
   supplying the second casting material at a second location of the cavity, which is located in the area of the add-on part to be produced; and
   controlling the introduction of the casting materials so that respective flow fronts of the casting materials meet in a region of the casting component remote from the add-on component.

* * * * *